United States Patent
Jacob et al.

(10) Patent No.: US 11,061,186 B2
(45) Date of Patent: Jul. 13, 2021

(54) WAVEGUIDE STRUCTURES

(71) Applicants: GLOBALFOUNDRIES U.S. INC., Santa Clara, CA (US); KHALIFA UNIVERSITY OF SCIENCE AND TECHNOLOGY, Abu Dhabi (AE)

(72) Inventors: Ajey Poovannummoottil Jacob, Watervliet, NY (US); Marcus V. S. Dahlem, Santa Maria da Feira (PT); Humaira Zafar, Abu Dhabi (AE); Anatol Khilo, Lexington, MA (US); Sujith Chandran, Abu Dhabi (AE)

(73) Assignees: GLOBALFOUNDRIES U.S. INC., Santa Clara, CA (US); KHALIFA UNIVERSITY OF SCIENCE AND TECHNOLOGY, Abu Dhabi (AE)

( * ) Notice: Subject to any disclaimer, the term of this patent is extended or adjusted under 35 U.S.C. 154(b) by 0 days.

(21) Appl. No.: 16/199,468

(22) Filed: Nov. 26, 2018

(65) Prior Publication Data
US 2020/0166702 A1 May 28, 2020

(51) Int. Cl.
| G02B 6/12 | (2006.01) |
| G02B 6/125 | (2006.01) |
| G02B 6/124 | (2006.01) |
| G02B 6/136 | (2006.01) |

(52) U.S. Cl.
CPC ............. *G02B 6/125* (2013.01); *G02B 6/124* (2013.01); *G02B 6/136* (2013.01); *G02B 2006/12061* (2013.01); *G02B 2006/12119* (2013.01); *G02B 2006/12173* (2013.01)

(58) Field of Classification Search
CPC ........ G02B 6/125; G02B 6/124; G02B 6/136; G02B 2006/12119; G02B 2006/12061; G02B 2006/12173
See application file for complete search history.

(56) References Cited

U.S. PATENT DOCUMENTS

| 4,349,905 | A | * | 9/1982 | Ackley | ............... | H01S 5/04254 |
| | | | | | | 372/46.01 |
| 5,349,602 | A | * | 9/1994 | Mehuys | ............. | G02B 6/12004 |
| | | | | | | 359/344 |
| 5,601,731 | A | * | 2/1997 | Hillmer | .................. | G02B 6/124 |
| | | | | | | 438/32 |
| 6,810,054 | B2 | * | 10/2004 | Sousa | .................... | H01S 5/2231 |
| | | | | | | 372/45.01 |

(Continued)

OTHER PUBLICATIONS

Anderson, Brian, Transverse mode selection and brightness enhancement in laser resonators by means of volume Bragg gratings, Dissertation, University of Central Florida, 2015 (Year: 2015).*

(Continued)

*Primary Examiner* — Peter Radkowski
(74) *Attorney, Agent, or Firm* — Francois Pagette; Andrew M. Calderon; Roberts Calderon Safran & Cole, P.C.

(57) ABSTRACT

The present disclosure relates to semiconductor structures and, more particularly, to rib waveguide structures and methods of manufacture. The structure includes: a waveguide structure comprising one or more bends, an input end and an output end; and grating structures which are positioned adjacent to the one or more bends of the waveguide structure.

20 Claims, 8 Drawing Sheets

(56) References Cited

U.S. PATENT DOCUMENTS

| | | | | |
|---|---|---|---|---|
| 6,898,227 | B2* | 5/2005 | Crawford | H01S 5/22 372/45.01 |
| 8,396,091 | B2* | 3/2013 | Kalosha | H01S 5/1003 372/102 |
| 8,755,647 | B2* | 6/2014 | Yaacobi | G02B 6/12007 385/27 |
| 8,934,508 | B2* | 1/2015 | Sakamoto | G02B 6/02138 372/6 |
| 9,048,631 | B2* | 6/2015 | Eichler | B82Y 20/00 |
| 9,166,369 | B2* | 10/2015 | Kanskar | H01S 5/1003 |
| 9,214,786 | B2* | 12/2015 | Hemenway | H01S 5/2036 |
| 9,411,106 | B2* | 8/2016 | Doany | G02B 6/34 |
| 9,627,852 | B2* | 4/2017 | Hemenway | H01S 5/2036 |
| 9,690,045 | B2* | 6/2017 | Goodwill | G02B 6/126 |
| 2003/0112842 | A1* | 6/2003 | Crawford | H01S 5/22 372/46.01 |
| 2007/0133648 | A1* | 6/2007 | Matsuda | H01S 5/12 372/102 |
| 2007/0248134 | A1* | 10/2007 | Hatori | H01S 5/12 372/45.01 |
| 2010/0142579 | A1* | 6/2010 | Leem | H01S 5/026 372/50.11 |
| 2012/0177077 | A1* | 7/2012 | Erbert | H01S 5/2036 372/50.11 |
| 2012/0195335 | A1* | 8/2012 | Kalosha | H01S 5/1003 372/45.01 |
| 2013/0016742 | A1* | 1/2013 | Sakamoto | G02B 6/02138 372/6 |
| 2013/0089115 | A1* | 4/2013 | Kanskar | H01S 5/1014 372/45.01 |
| 2013/0116742 | A1* | 5/2013 | Lavoisier | A61N 1/0452 607/39 |
| 2013/0272652 | A1* | 10/2013 | Yaacobi | G02B 6/1226 385/27 |
| 2014/0064311 | A1* | 3/2014 | Eichler | H01S 5/2218 372/45.01 |
| 2014/0301421 | A1* | 10/2014 | Kanskar | H01S 5/0287 372/46.01 |
| 2015/0277042 | A1* | 10/2015 | Goodwill | G02B 6/126 385/11 |
| 2016/0091664 | A1* | 3/2016 | Doany | G02B 6/126 385/37 |

OTHER PUBLICATIONS

Van Iseghem et al., On-chip beam shaping using lateral leakage, Proceedings Symposium IEEE Photonics Society Benelux, 2018, Brussels, Belgium, Poster—Paper—Nov. 16, 2018 (Year: 2018).*

Xiaowei Guan et al. Silicon hybrid nanoplasmonics for ultra-dense photonic integration, Front. Optoelectron. 2014, 7(3): 300-319 (Year: 2014).*

Xiaowei Guan, Hao Wu, Yaocheng Shi, and Daoxin Dai, "Extremely small polarization beam splitter based on a multimode interference coupler with a silicon hybrid plasmonic waveguide," Opt. Lett. 39, 259-262 (2014) (Year: 2014).*

Huan Li, Jong W. Noh, Yu Chen, and Mo Li, "Enhanced optical forces in integrated hybrid plasmonic waveguides," Opt. Express 21, 11839-11851 (2013) (Year: 2013).*

B. Ni and J. Xiao, "A Hybrid Plasmonic Waveguide-based TE-Pass Slot Waveguide Polarizer," in Advanced Photonics 2018 (BGPP, IPR, NP, NOMA, Sensors, Networks, SPPCom, SOF), OSA Technical Digest (online) (Optical Society of America, 2018), paper IW4B.2. (Year: 2018).*

Xiaowei Guan, Pengxin Chen, Sitao Chen, Peipeng Xu, Yaocheng Shi, and Daoxin Dai, "Low-loss ultracompact transverse-magnetic-pass polarizer with a silicon subwavelength grating waveguide," Opt. Lett. 39, 4514-4517 (2014) (Year: 2014).*

Zhenzhao Guo and Jinbiao Xiao, Silicon-Based Ultracompact TE-Pass/TM-Stop Power Divider Using Subwavelength Gratings Assisted With Segmented Hybrid Plasmonic Horizontal Slot Waveguides, Journal of Lightwave Technology, vol. 35, No. 19, Oct. 1, 2017 (Year: 2017).*

Dai et al., "Compact broadband polarizer based on shallowly-etched silicon-on-insulator ridge optical waveguides," Optics Express, vol. 18 (26), Dec. 2010, 13 pages.

Paredes et al., "Silicon photonic TE polarizer using adiabatic waveguide bends," OptoElectronics Communication Conference (OECC), 2016, 3 pages.

Bauters et al., "High extinction, broadband, and low loss planar waveguide polarizers," Adavanced Photonics Congress, OSA 2012, 3 pages.

Bauters et al., "Ultra low-loss planar Si3N4 waveguide polarizer," IEEE Photonics Journal, vol. 5 (1), Feb. 2013, 8 pages.

* cited by examiner

FIG. 4B
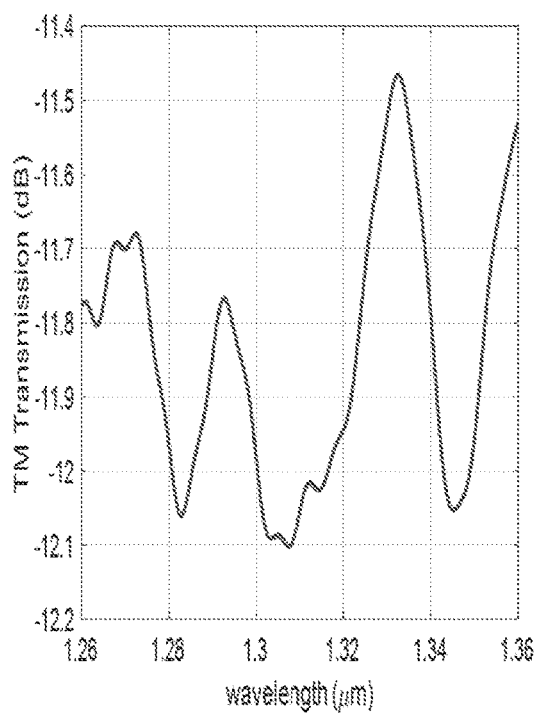
FIG. 4C
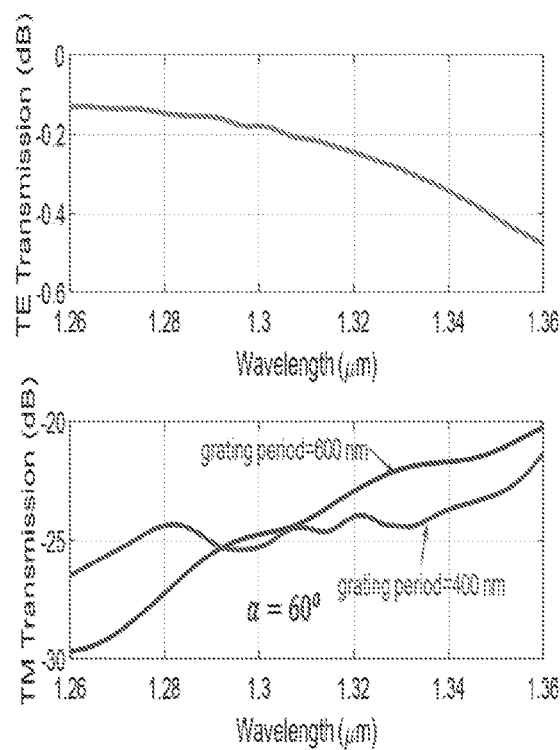
FIG. 4D

P = 500 nm, α = 90°
Footprint = 45 μm

WAVEGUIDE STRUCTURES

FIELD OF THE INVENTION

The present disclosure relates to semiconductor structures and, more particularly, to waveguide structures and methods of manufacture.

BACKGROUND

A waveguide guides waves such as electromagnetic waves through a medium with minimal loss of energy by restricting its expansion. Without the physical constraint of a waveguide, wave amplitudes decrease according to the inverse square law as they expand into three dimensional space. Accordingly, the waveguide guides optical waves by total internal reflection.

Polarization in a TM (transverse magnetic) transmission mode or a TE (transverse electric) transmission mode are important in photonic integrated circuits for optical sensing, communication, and signal processing, as examples. The principle of the polarizer is to make one polarization of one type of transmission mode more lossy than another type of transmission mode.

Current polarizers require different waveguide dimensions (e.g., height and width) to transmit in either the TE transmission mode or TM transmission mode. This adds complexity in device fabrication. Also, constant-radius bend polarizers have junctions with opposite signs of curvature, which leads to mode mismatch and subsequent scattering, elevating the insertion loss of the polarizer.

SUMMARY

In an aspect of the disclosure, a structure comprises: a waveguide structure comprising one or more bends, an input end and an output end; and grating structures which are positioned adjacent to the one or more bends of the waveguide structure.

In an aspect of the disclosure, a structure comprises: a waveguide structure fabricated on a silicon on insulator wafer, the waveguide structure composed of one or more bends, and opposing straight sections comprising an input and an output; and grating structures positioned on opposing sides of the waveguide structure and at least between the input end and the output end, the grating structures configured to scatter leaked/radiated energy (waves) from the waveguide structure.

In an aspect of the disclosure, a structure comprises: a curved waveguide structure fabricated on a photonic compatible platform; and grating structures positioned on opposing sides of the curved waveguide structure between an input end and the output end. The curved waveguide structure has at least a fixed height, with an input end and the output end. The curve of the curved waveguide structure includes a curvature that changes linearly from zero at the input end to its maximum value and then decreases linearly back to zero at the output end. The curved waveguide structure and the grating structures are fabricated from any of silicon, SiN, Poly-Si, doped silicon, doped Poly-Si or Ge doped Si.

BRIEF DESCRIPTION OF THE DRAWINGS

The present disclosure is described in the detailed description which follows, in reference to the noted plurality of drawings by way of non-limiting examples of exemplary embodiments of the present disclosure.

FIGS. 4B-4D show performance graphs of the waveguide structure and grating structures of FIG. 4A.

DETAILED DESCRIPTION

The present disclosure relates to semiconductor structures and, more particularly, to waveguide structures and methods of manufacture. More specifically, the present disclosure describes a waveguide structure with a TE (transverse electric) pass polarizer based on adiabatic bends and gratings assisted scattering structures. Advantageously, the structures described herein can be scaled to few micrometers (compared to millimeters in previous designs), in addition to being less dependent on dimensional variation and wavelength shift for polarizing certain transmission modes.

The waveguide structures of the present disclosure can be manufactured in a number of ways using a number of different tools. In general, though, the methodologies and tools are used to form structures with dimensions in the micrometer and nanometer scale. The methodologies, i.e., technologies, employed to manufacture the rib waveguide structures of the present disclosure have been adopted from integrated circuit (IC) technology. For example, the structures are built on wafers and are realized in films of material patterned by photolithographic processes on the top of a wafer. In particular, the fabrication of the rib waveguide structures uses three basic building blocks: (i) deposition of thin films of material on a substrate, (ii) applying a patterned mask on top of the films by photolithographic imaging, and (iii) etching the films selectively to the mask.

Figure 1:
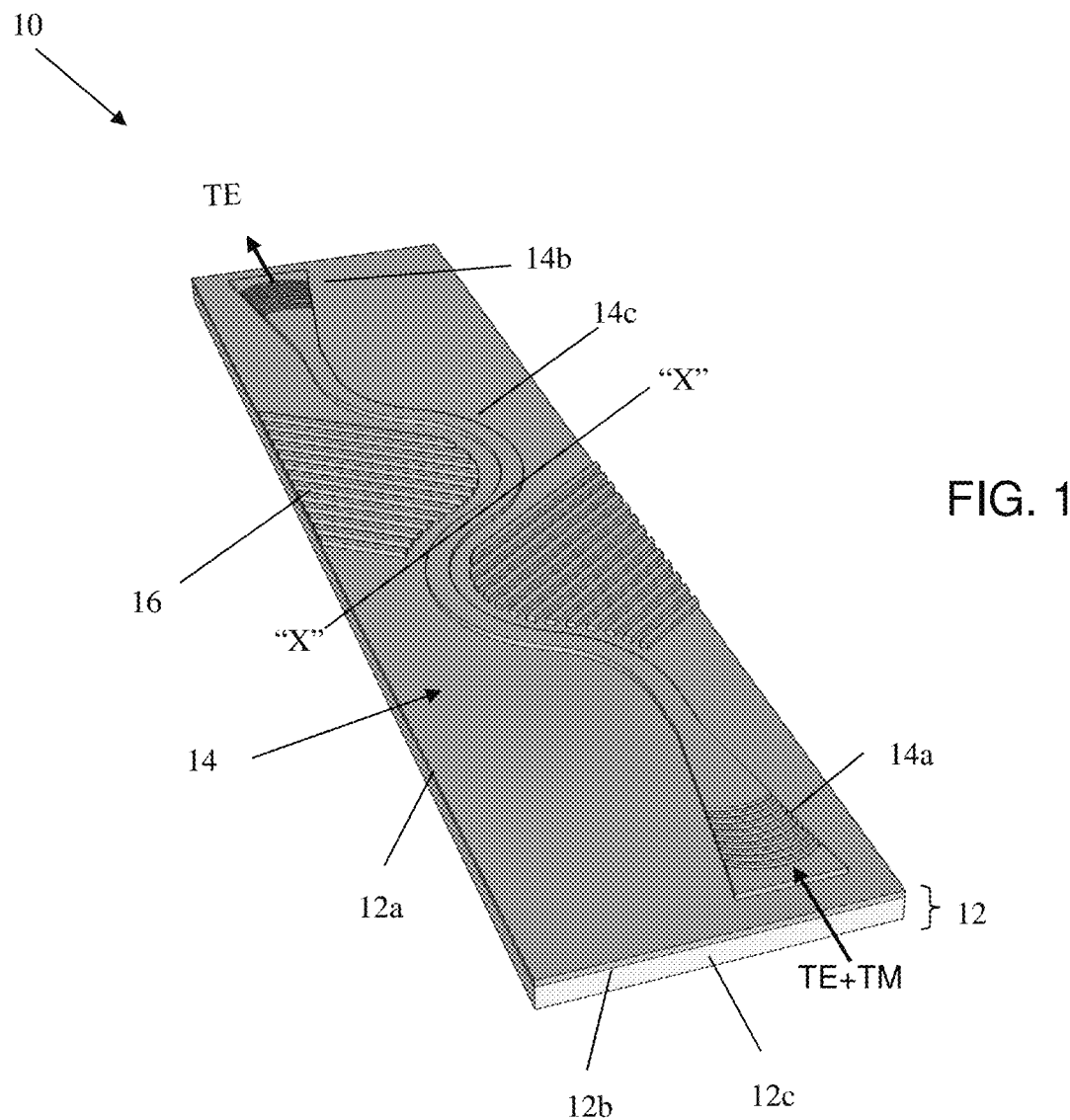
FIG. 1 shows a waveguide and rib structures, amongst other features, and respective fabrication processes in accordance with aspects of the present disclosure.

FIG. 1 shows a waveguide structure and rib (gratings) structures, amongst other features, and respective fabrication processes in accordance with aspects of the present disclosure. More specifically, the structure 10 of FIG. 1 includes a waveguide structure 14 fabricated on a substrate 12. In embodiments, the substrate 12 can be a silicon on insulator (SOI) substrate. In particular, the substrate 12 includes a semiconductor material 12a bonded to an insulator layer 12b. The semiconductor material 12a can be composed of any suitable material including, but not limited to, Si, SiGe, SiGeC, SiC, GaAs, InAs, InP, and other III/V or II/VI compound semiconductors. The insulator layer 12b can be a buried oxide material (BOX); although other insulator materials are also contemplated herein. The insulator layer 12b is bonded to a semiconductor wafer 12c.

The waveguide structure 14 includes an input end 14a (e.g., grating coupler or edge coupler) and an output end 14b. The waveguide structure 14 further includes a curved section 14c based on, e.g., Euler spirals, between the input end 14a and the output end 14b. The curved section 14c includes bends that can change linearly (with its curve length) from zero (at its input 14a) to its maximum value (1/Rmin) and then decrease linearly back to zero (at its output 14b). The bends also have regions of maximum and minimum radius, and can be cascaded (more than one) as further described herein.

Still referring to FIG. 1, the waveguide structure 14 can be of a fixed height and width; although other dimensions are contemplated herein. The waveguide structure 14 can be fabricated of Si, SiN, Poly-Si or any polymer waveguide materials, e.g., doped Si, doped poly and Ge doped Si materials. Moreover, rib waveguide structure 16 can be fabricated from InAs or InP. In addition, the waveguide structure can be fabricated in any other material platform that allows to build planar photonic integrated circuits, e.g., bulk Si. By way of example, the waveguide structure 10 can be fabricated on the silicon on insulator (SOI) wafer 12, with the buried oxide (BOX) region 12b below the waveguide structure 14. An oxide cladding can be provided above the waveguide structure 14. In further alternative embodiments, the BOX and the over-cladding can be replaced by another material, preferably with a refractive index lower than the core.

FIG. 1 further shows grating structures 16 (rib structures) which are adjacent to the waveguide structure 14. In FIG. 1, the grating structures 16 are parallel rib structures preferably adjacent to the curved section 14c (bend structures), which can be oriented parallel or perpendicular to the waveguide axis "X" or other orientation. The grating structures 16 are one dimensional (1D) and can be fabricated of silicon or Si, SiN or Poly-Si or any polymer waveguide materials, e.g., InAs or InP. In addition, the grating structures 16 can be fabricated from other materials as described herein. Moreover, the grating structures 16 can be fabricated in any other material platform that allows to build planar photonic integrated circuits, e.g., bulk Si.

In further embodiments, the grating structures 16 can be fabricated either with the same materials or different materials from the waveguide structures 14. The grating structures 16 can also be fabricated with additional layers of different materials, e.g., fabricated with metal (either fully metallic structure or metal deposited on top of the dielectric material). For example, the grating structures 16 can be fabricated with (i) a metallic layer, e.g., gold, (ii) doped (heavily) silicon, (iii) doped (heavily) polysilicon, or (iv) germanium doped silicon. The grating structures 16 can also be of the same or different height as the waveguide structures 14, periodic or aperiodic or apodized or having a grating period varied for optimizing different wavelengths and/or extinction ratios. In any of these embodiments, the TM (transverse magnetic) wave and TE (transverse electric) wave can be inputted into the input end 14a of the waveguide structure 14, with the TM (transverse magnetic) wave being leaked out from the curves and removed or scattered by the grating structures 16 hence allowing the TE (transverse electric) wave to pass through the output end 14b of the waveguide structure 14.

The waveguide structure 14 and the grating structures 16 can be fabricated from the same material or different materials, including the same material as the substrate 12, e.g., semiconductor material 12a. In the case that the waveguide structure 14 and the grating structures 16 are fabricated from the same material as the semiconductor material 12a, these features can be fabricated (patterned) by the same conventional lithography and etching processes, e.g., reactive ion etching (RIE). In the case that the waveguide structure 14 and the grating structures 16 are fabricated from the same materials (but not necessarily the substrate material), these features can be fabricated by the same conventional deposition, e.g., chemical vapor deposition (CVD) processes, followed by the same lithography and etching processes for patterning purposes. In the case that the waveguide structure 14 and the grating structures 16 are fabricated from different materials, these features can be fabricated by the separate deposition, lithography and etching processes.

As should be understood by those of skill in the art, a conventional lithography and etching process includes a resist formed over the semiconductor material 12a. The resist is then exposed to energy (light) to form a pattern (opening). An etching process with a selective chemistry, e.g., reactive ion etching (RIE), will be used to form the patterns in the semiconductor material 12a or other material, resulting in the formation of the waveguide structure 14 and the grating structures 16. The resist can be removed by a conventional oxygen ashing process or other known stripants.

Figure 2:
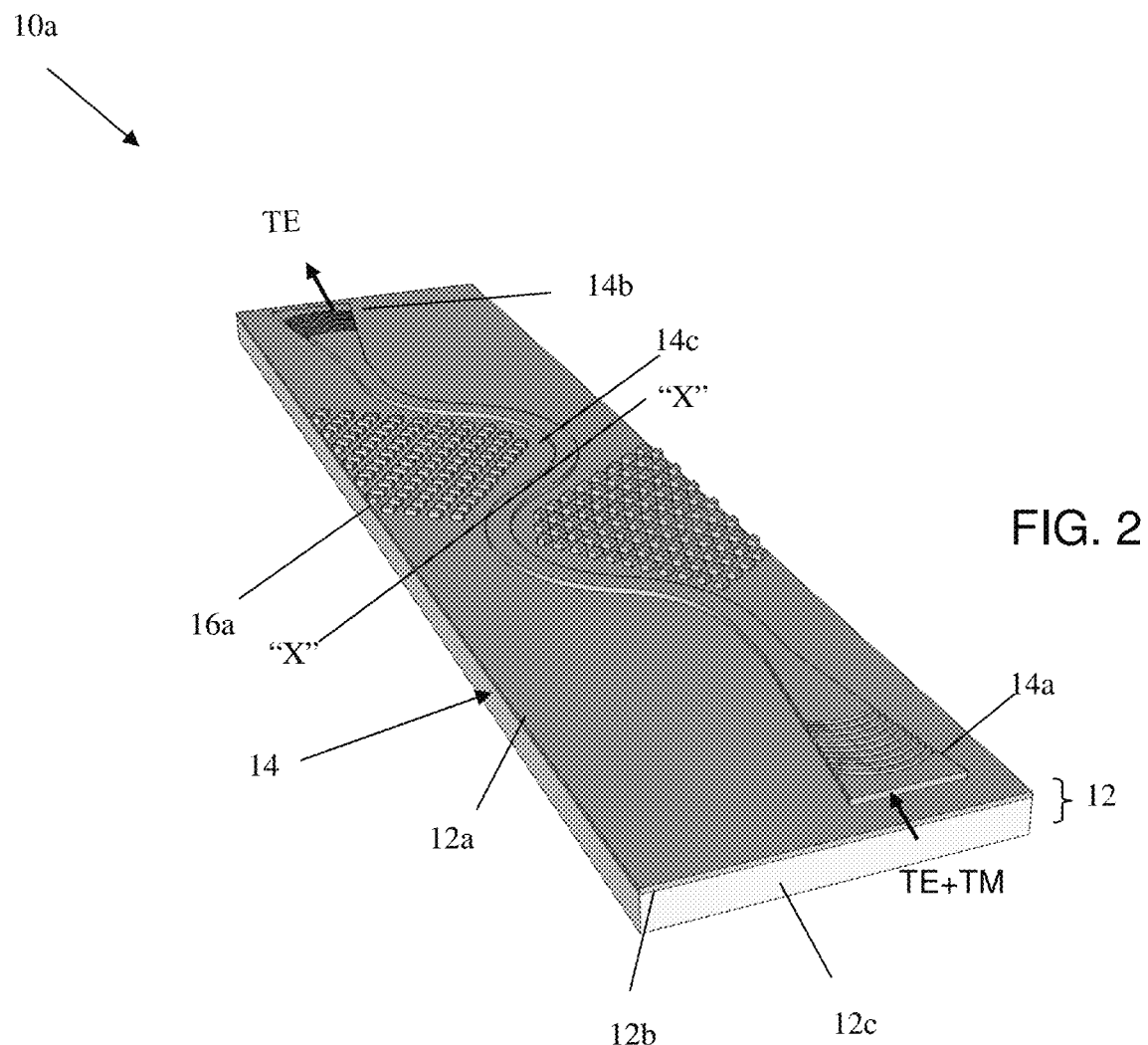
FIG. 2 shows a waveguide and rib structures, amongst other features, and respective fabrication processes in accordance with additional aspects of the present disclosure.

FIG. 2 shows a waveguide structure and rib structures, amongst other features, and respective fabrication processes in accordance with additional aspects of the present disclosure. More specifically, the structure 10a of FIG. 2 includes the waveguide structure 14 fabricated on the substrate 12, similar to that described with respect to FIG. 1. Specifically, the waveguide structure 14 includes an input end 14a (e.g., grating coupler or edge coupler) and an output end 14b, with a curved section 14c based on, e.g., Euler spirals. The curved section 14c can include bends that can change linearly (with its curve length) from zero (at its input 14a) to its maximum value (1/Rmin) and then decrease linearly back to zero (at its output 14b). The bends also have regions of maximum and minimum radius, and can be cascaded (more than one) in the device as further described herein.

The waveguide structure 14 can be of a fixed height and width; although other dimensions are contemplated herein. The waveguide structure 14 can be fabricated from the same materials as noted above, and in any other material platform that allows to build planar photonic integrated circuits as already described herein. An oxide cladding can be provided above the waveguide structure 14. In further alternative embodiments, the BOX and the over-cladding can be replaced by another material, preferably with a refractive index lower than the core as described already herein.

FIG. 2 further shows alternative grating structures 16a which are adjacent to the waveguide structure 14. In FIG. 2, the grating structures 16a are two dimensional (2D) structures preferably adjacent to the curved section 14c (bend structures), which can be oriented in parallel or perpendicular to the waveguide axis "X" or other orientation. The grating structures 16a can be a plurality of squares, ovals, rectangles, circles or other shapes which will scatter the TM (transverse magnetic) wave as it passes through the waveguide structure 14, allowing the TE (transverse electric) wave to pass through and be output at the output end 14b.

As noted with respect to FIG. 1, the grating structures 16a of FIG. 2 can be fabricated from the same materials as already described, e.g., with the same materials or different materials from the waveguide structures 14. The grating structures 16a can also be of the same or different height as the waveguide structures 16a, periodic or aperiodic or apodized or having a grating period varied for optimizing different wavelengths and/or extinction ratios. In any of these embodiments, the TM (transverse magnetic) wave inputted into the input 14a of the waveguide structure 14 is being leaked out from the curves and removed (scattered) by the grating structures 16a, allowing the TE (transverse electric) wave to pass through the output end 14b of the waveguide structure 14.

Figure 3:
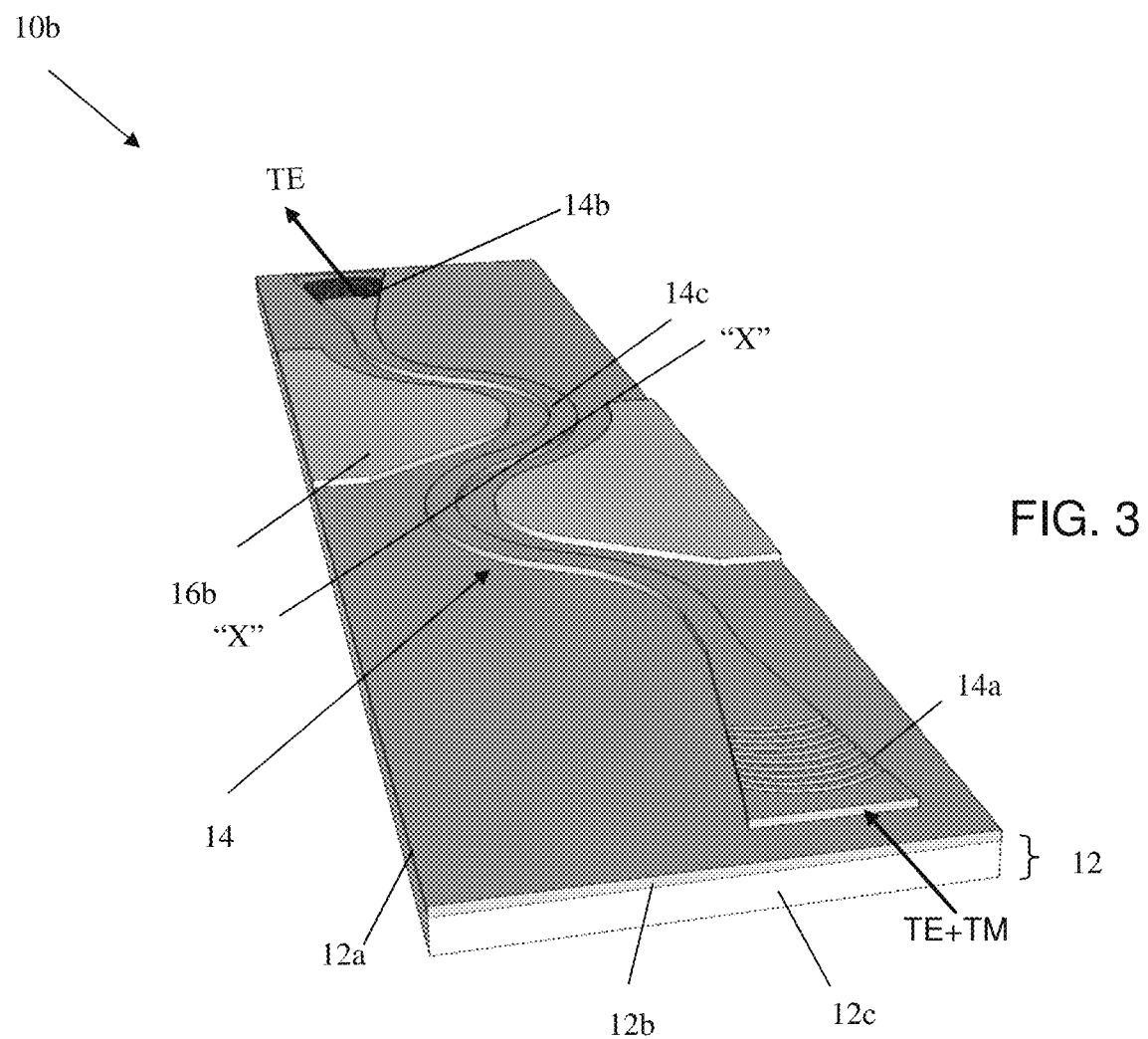
FIG. 3 shows a waveguide and rib structures, amongst other features, and respective fabrication processes in accordance with yet additional aspects of the present disclosure.

FIG. 3 shows a waveguide and grating structures, amongst other features, and respective fabrication processes in accordance with additional aspects of the present disclosure. More specifically, the structure 10b of FIG. 3 includes the waveguide structure 14 fabricated on the substrate 12, similar to that described with respect to FIGS. 1 and 2. The grating structures 16b, though, are composed of a fully metallic layer (with no pattern or ribbing), adjacent to the waveguide structure 14. The edges of the grating structures 16b can be oriented in parallel or perpendicular to the waveguide axis "X" or other orientation. The grating structures 16b will scatter the TM wave as it passes through the waveguide structure 14, allowing the TE wave to pass through and be output at output end 14b. In any of these embodiments, the TM wave inputted into the input end 14a of the waveguide structure 14 is being leaked out from the curves and removed (scattered) by the grating structures 16a, allowing the TE (transverse electric) wave to pass through the output end 14b of the waveguide structure 14.

Figure 4A:
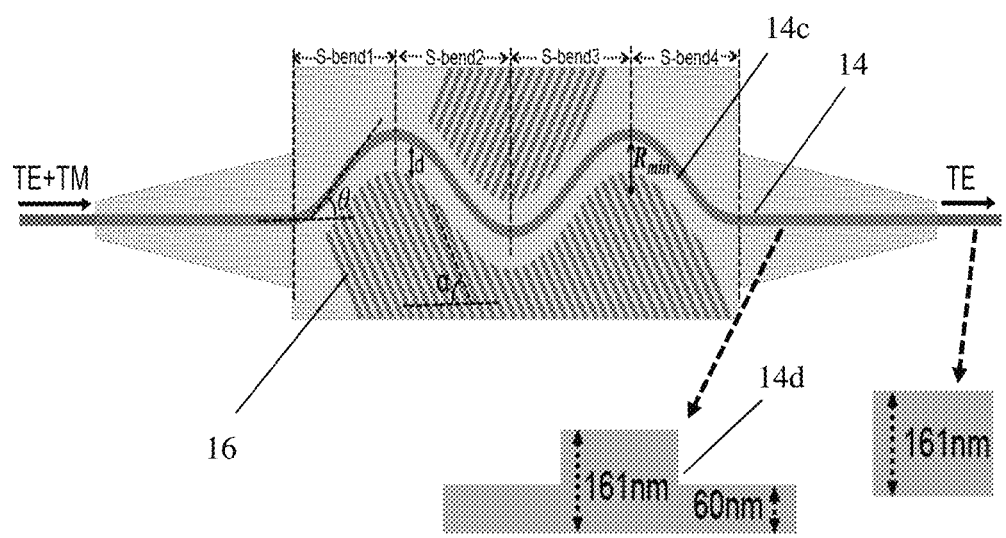
FIGS. 4A, 5A, 6A and 7A show specific examples of a waveguide structure with the grating structures (ribs) positioned at different angles with respect to a longitudinal axis of the waveguide structure in accordance with aspects of the present disclosure.

FIG. 4A shows a specific example of a waveguide structure with the grating structures 16 (ribs) positioned at an angle of $\alpha=60°$ with respect to a longitudinal axis of the waveguide structure 14. In this representation, one set of grating structures 16 extends along the entirety of the bends (curvature 14c) on one side of the waveguide structure 14. Also, although five (5) bends are shown, the waveguide structure 14 can include a different amount of bends. Moreover, the waveguide structure 14 can include a stepped feature 14d, with a total thickness of about 161 nm; although other dimensions are contemplated herein. Also, it should be understood that the numbers provided herein are merely an illustrative example and should not be considered a limiting feature of the present disclosure.

FIGS. 4B-4D show performance graphs of the waveguide and grating structures of FIG. 4A. More specifically, FIGS. 4B and 4D show TM transmission loss; whereas, FIG. 4B shows TE transmission loss. The "x" axis of each graph represents wavelength. In particular, FIG. 4B shows an approximate TM transmission loss of −11 db to −12 db without grating structures 16 (ribs); whereas, FIG. 4D shows an approximate TM transmission loss of −20 db and −25 db with a grating period of 400 nm and 600 nm, respectively. On the other hand, FIG. 4C shows substantially no TE transmission loss across the waveguide structure. It should be understood that the results and numbers provided herein are merely an illustrative example and should not be considered a limiting feature of the present disclosure.

Figure 5A:
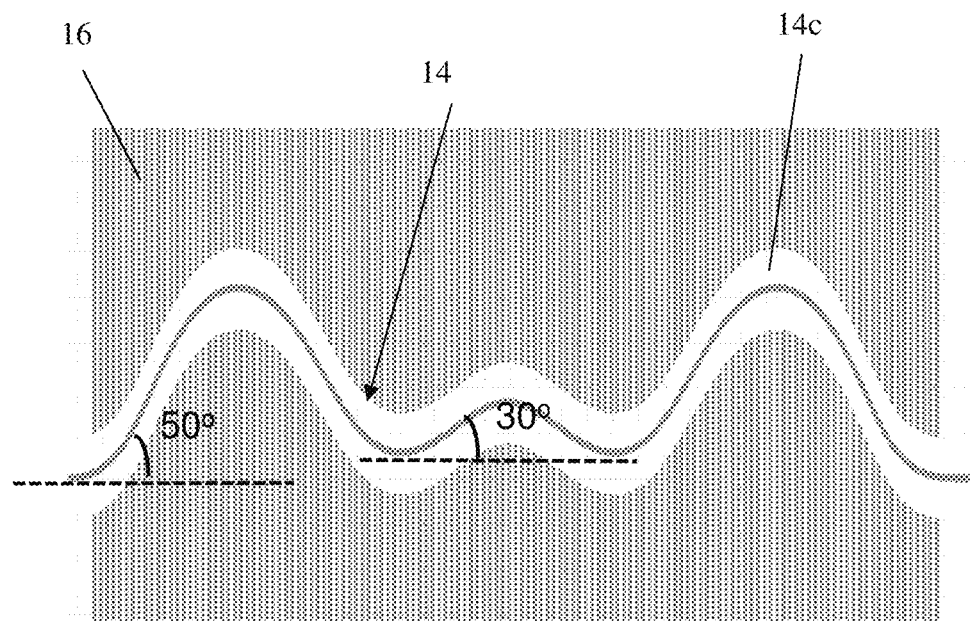

FIG. 5A shows another specific example of a waveguide structure with the grating structures 16 (ribs) positioned at an angle of $\alpha=90°$ with respect to a longitudinal axis of the waveguide structure 14, in addition to a grating pitch of 500 nm. In this representation, both the upper and lower grating structures 16 extend along the entirety of the bends (curvature 14c) on both sides of the waveguide structure 14. In addition, the waveguide structure 14 includes bends of different angles, e.g., 50° and 30° with respect to a longitudinal axis of the waveguide structure 14. Also, although seven (7) bends are shown, the waveguide structure 14 can include a different amount of bends cascaded along its length. Moreover, the waveguide structure 14 has a footprint of 77 μm×15 μm and Rmin (see FIG. 4A) of 5 μm. It should be understood that the numbers provided herein are merely an illustrative example and should not be considered a limiting feature of the present disclosure.

Figure 5B:
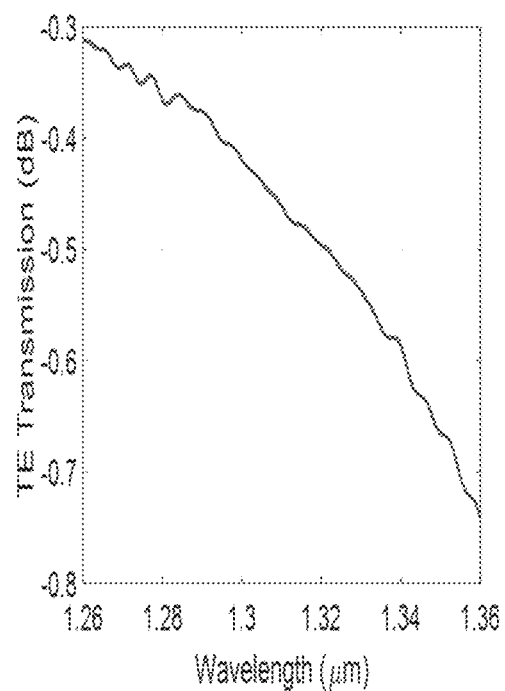
FIGS. 5B and 5C show performance graphs of the waveguide structure and grating structures of FIG. 5A.
Figure 5C:
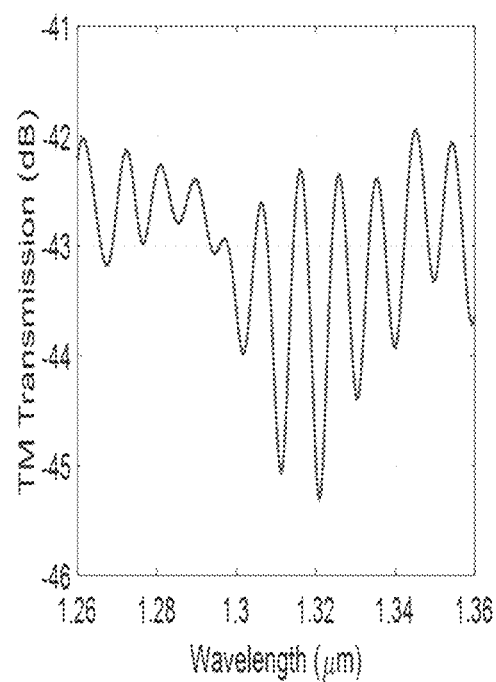

FIGS. 5B and 5C show performance graphs of the waveguide and grating structures of FIG. 5A. More specifically, FIG. 5B shows TE transmission loss; whereas, FIG. 5C shows TM transmission loss. The "x" axis of each graph represents wavelength. In particular, FIG. 5B shows an approximate TE transmission loss of −0.3 db; whereas, FIG. 5C shows a TM transmission of −42 db across the waveguide structure. It should be understood that the results and numbers provided herein are merely an illustrative example and should not be considered a limiting feature of the present disclosure.

Figure 6A:
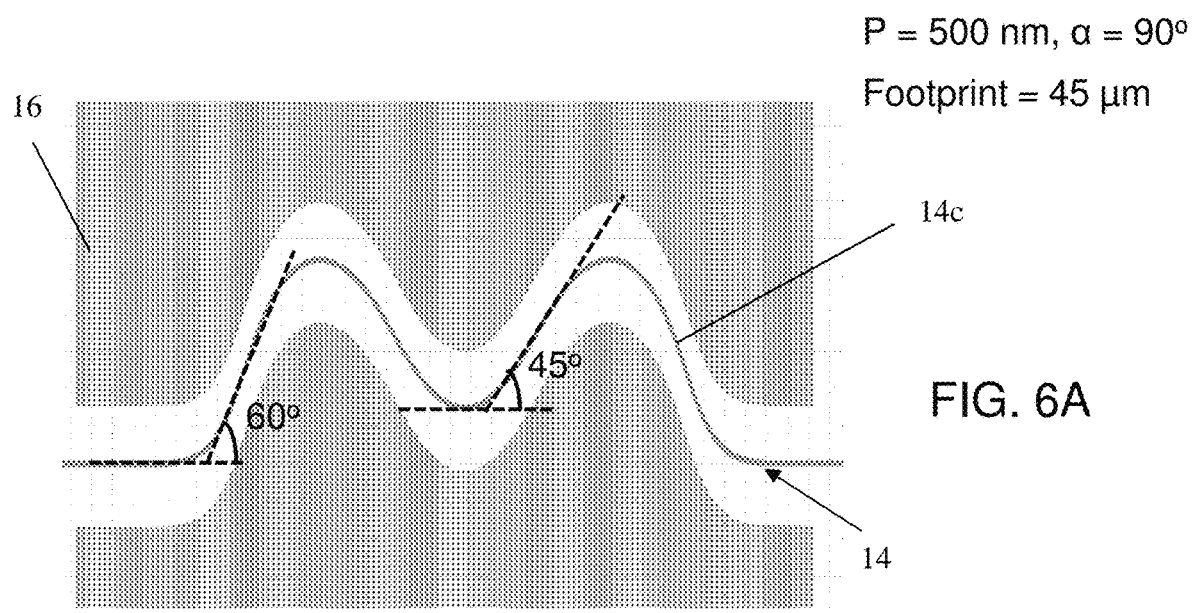

FIG. 6A shows another specific example of a waveguide structure with the grating structures 16 (ribs) positioned at an angle of $\alpha=90°$ with respect to a longitudinal axis of the waveguide structure 14, in addition to a grating pitch of 500 nm. In this representation, both the upper and lower grating structures 16 extend along the entirety of the bends (curvature 14c) on both sides of the waveguide structure 14. In addition, the waveguide structure 14 includes bends of different angles, e.g., 60° and 45° with respect to a longitudinal axis of the waveguide structure 14. Also, although five (5) bends are shown, the waveguide structure 14 can include a different amount of bends cascaded along its length. Moreover, the waveguide structure 14 has a footprint of 58 μm×15 μm and Rmin (see FIG. 4A) of 5 μm. Again, it should be understood that the numbers provided herein are merely an illustrative example and should not be considered a limiting feature of the present disclosure.

Figure 6B:
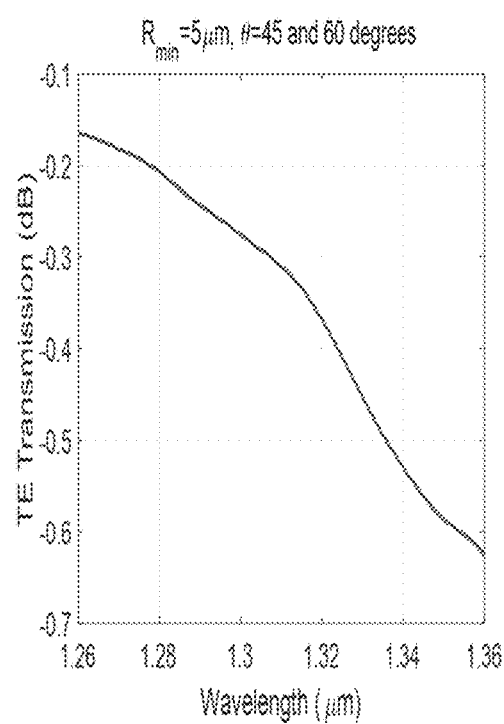
FIGS. 6B and 6C show performance graphs of the waveguide structure and grating structures of FIG. 6A.
Figure 6C:
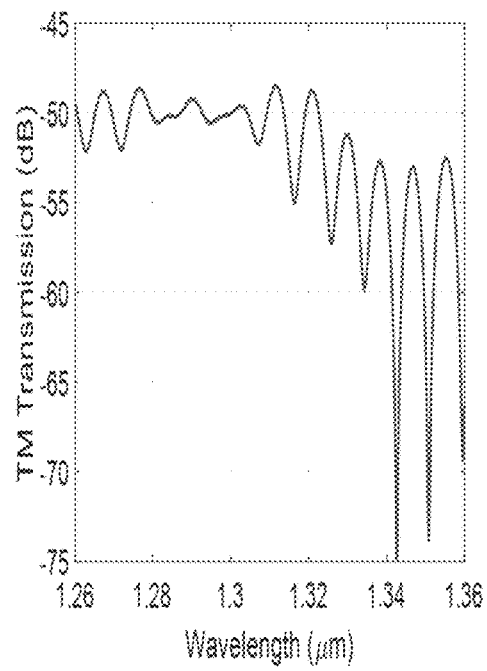

FIGS. 6B and 6C show performance graphs of the waveguide structure and grating structures of FIG. 6A. More specifically, FIG. 6B shows TE transmission loss; whereas, FIG. 6C shows TM transmission loss. The "x" axis of each graph represents wavelength. In particular, FIG. 6B shows an approximate TE transmission loss of approximately −0.2 db; whereas, FIG. 5C shows substantially a TM transmission of −50 db across the waveguide structure. Again, it should be understood that the results and numbers provided herein are merely an illustrative example and should not be considered a limiting feature of the present disclosure.

Figure 7A:
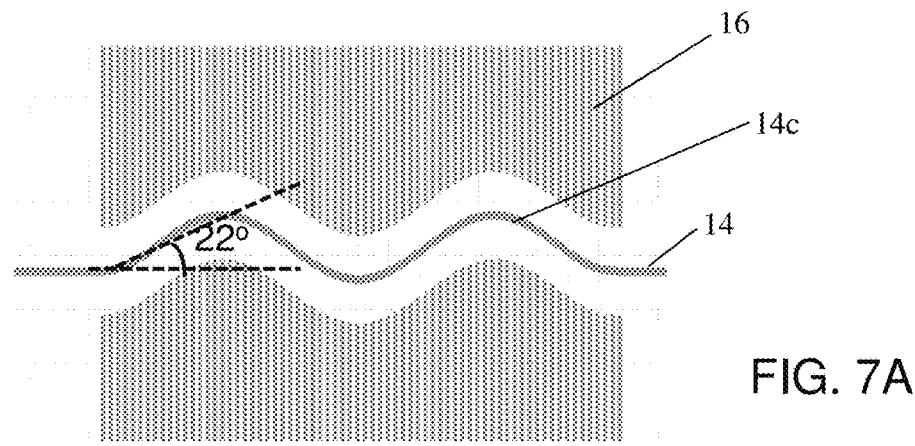

FIG. 7A shows another specific example of a waveguide structure with the grating structures 16 (ribs) positioned at an angle of $\alpha=90°$ with respect to a longitudinal axis of the waveguide structure 14, in addition to a grating pitch of 500 nm. In this representation, both the upper and lower grating structures 16 extend along the entirety of the bends (curvature 14c) on both sides of the waveguide structure 14. In addition, the waveguide structure 14 includes bends of 22° with respect to a longitudinal axis of the waveguide structure 14. Also, although five (5) bends are shown, the waveguide structure 14 can include a different amount of bends cascaded along its length. Moreover, the waveguide structure 14 has a footprint of 36 μm×7 μm and Rmin (see FIG. 4A) of 6 μm. It should be understood that the numbers provided herein are merely an illustrative example and should not be considered a limiting feature of the present disclosure.

Figure 7B:
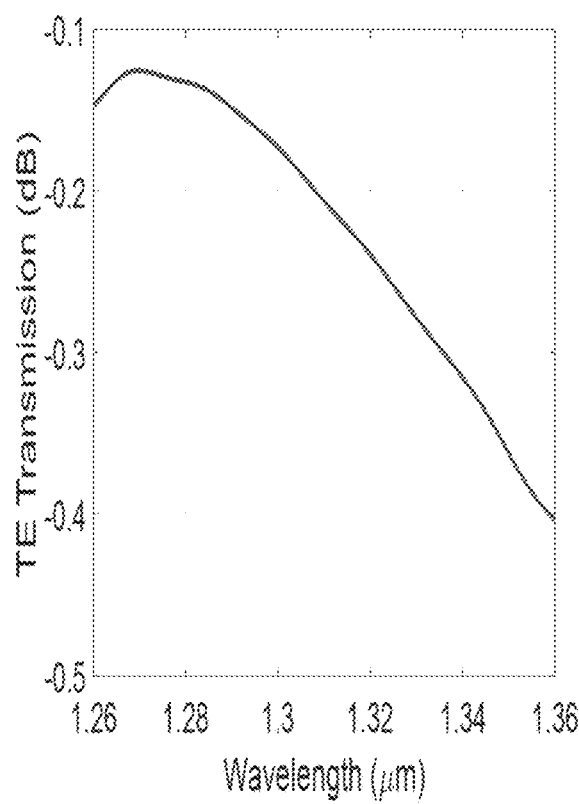
FIGS. 7B and 7C show performance graphs of the waveguide structure and grating structures of FIG. 7A.
Figure 7C:
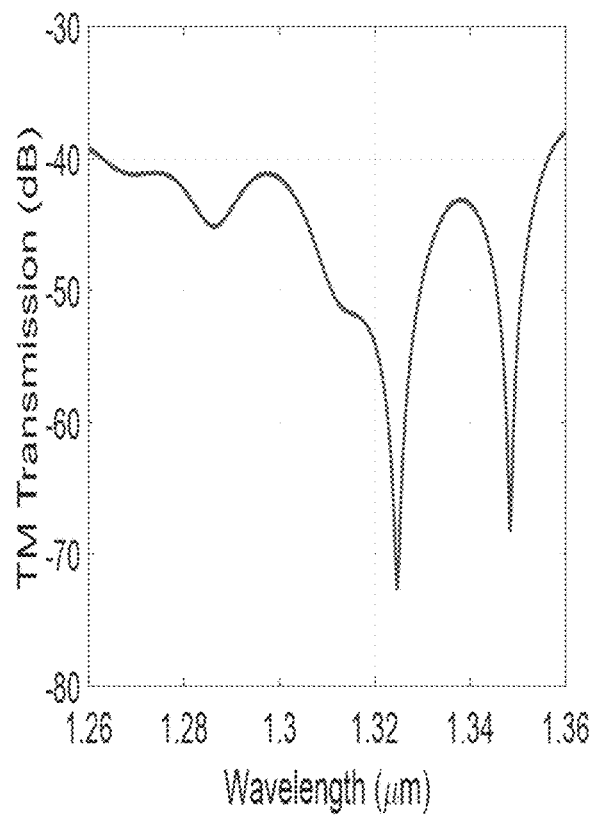

FIGS. 7B and 7C show performance graphs of the waveguide structure and grating structures of FIG. 7A. More specifically, FIG. 7B shows TE transmission loss; whereas, FIG. 7C shows TM transmission loss. The "x" axis of each graph represents wavelength. In particular, FIG. 7B shows an approximate TE transmission loss of approximately −0.2 db; whereas, FIG. 7C shows substantially a TM transmission of −40 db across the waveguide structure. It should be understood that the results and numbers provided herein are merely an illustrative example and should not be considered a limiting feature of the present disclosure.

The method(s) as described above is used in the fabrication of integrated circuit chips. The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed:

1. A structure, comprising:
   a waveguide structure comprising one or more bends, an input end and an output end, the waveguide structure comprising a first semiconductor material; and
   grating structures which are positioned adjacent to the one or more bends of the waveguide structure and which are structured to scatter a leaked transverse wave away from the waveguide structure, wherein
   the grating structures include an upper grating structure on a first side of the waveguide structure and a lower grating structure on a second side of the waveguide structure,
   the upper grating structure and lower grating structure extend along the entirety of the bends on the first side and the second side of the waveguide structure,
   the grating structures are ribs each of which are positioned at a constant angle with respect to a longitudinal axis of the waveguide structure and each of which have a constant grating pitch,
   the grating structures comprise a second semiconductor material different than the first semiconductor material, and
   the grating structures scatter a transverse magnetic wave as it passes through the waveguide structure, allowing a transverse electric wave to pass through and be output at the output end.

2. The structure of claim 1, wherein the waveguide structure has a fixed height and width, with the input end and the output end on straight portions of the waveguide structure.

3. The structure of claim 1, wherein the waveguide structure has a fixed height and varying width, with the input end and the output end on straight portions of the waveguide structure.

4. The structure of claim 1, wherein the one or more bends are based on Euler spirals and the ribs comprise parallel ribs extending along an entirety of the one or more bends on the first side and the second side of the waveguide structure, such that the parallel ribs on both the first side and the second side are positioned at an angle of $\alpha=90°$ with respect to a longitudinal axis of the waveguide structure.

5. The structure of claim 3, wherein the one or more bends have a curvature that changes linearly from zero to its maximum value and then decreases linearly back to zero.

6. The structure of claim 5, wherein the one or more bends have regions of maximum and minimum radius.

7. The structure of claim 3, wherein the one or more bends are cascaded along a length of the waveguide structure.

8. The structure of claim 3, wherein the one or more bends are cascaded along an arbitrary direction of the waveguide structure.

9. The structure of claim 3, wherein the waveguide structure is fabricated from silicon or SiN or Poly-Si, doped silicon, doped Poly-Si or Ge doped Si.

10. The structure of claim 1, wherein:
    the grating structures are structures remotely positioned from the waveguide structure and which are further adjacent to the one or more bends of the waveguide structure;
    the one or more bends change linearly with its curve length from zero at the input end to a maximum value (1/Rmin) and then decreases linearly back to zero at the output end;
    the waveguide structure is of a fixed height and width;
    a cladding is provided above the waveguide structure; and
    the grating structures have a grating period varied for optimizing different wavelengths and/or extinction ratios.

11. The structure of claim 1, wherein the grating structures are structures remotely positioned from the waveguide structure and which are further oriented in parallel or perpendicular to a longitudinal axis of the waveguide structure, the grating structures:
    the ribs are parallel ribs positioned at both the first side and the second side, and straight portions of the input end and the output end, and each of the parallel ribs are at an angle of $\alpha=90°$ with respect to a longitudinal axis of the waveguide structure and the constant grating pitch, and
    the waveguide structure includes bends of different angles with respect to a longitudinal axis of the waveguide structure.

12. The structure of claim 1, wherein the grating structures are 1D which are remotely positioned from the waveguide structure.

13. The structure of claim 1, wherein the grating structures are fabricated from one of a same material as the waveguide structure and from layers of different material, and which are remotely positioned from the waveguide structure.

14. The structure of claim 1, wherein the grating structures are composed of a fully metallic monolithic layer devoid of ribbing or separate patterned shapes, adjacent to the waveguide structure, and which scatter a transverse magnetic (TM) wave as it passes through the waveguide structure, the TM wave is inputted into the input end of the waveguide structure and leaked out from the one or more bends and scattered by the grating structures.

15. The structure of claim 1, wherein the grating structures are periodic or aperiodic or apodized.

16. The structure of claim 1, wherein the above and below the waveguide structure are positioned and structured to scatter different types of transmissions.

17. A structure, comprising:
  a waveguide structure fabricated on a silicon on insulator wafer, the waveguide structure composed of one or more bends, and opposing straight sections comprising an input and an output; and
  grating structures separated from the waveguide structure and positioned on opposing sides of the waveguide structure at least between the input end and the output end, the grating structures configured to scatter leaked/radiated energy away from the waveguide structure, wherein:
  the grating structures comprise parallel ribs extending along the entirety of the one or more bends on a first side and a second side of the waveguide structure, such that the parallel ribs on both the first side and the second side are positioned at an angle of $\alpha=90°$ with respect to a longitudinal axis of the waveguide structure.

18. The structure of claim 17, wherein the grating structures are discrete shapes separated from another and which are arranged in parallel rows at a constant angle with respect to the waveguide structure a same material as the waveguide structure.

19. A structure, comprising:
  a curved waveguide structure fabricated on a photonic compatible platform; and
  grating structures positioned adjacent to and on opposing sides of the curved waveguide structure between an input end and output end of the curved waveguide structure, the grating structures being on a same level as the curved waveguide structure and being structured to scatter a leaked transverse wave away from the waveguide structure,
  wherein the curved waveguide structure has at least a fixed height, with an input end and the output end,
  wherein the curve of the curved waveguide structure includes a curvature that changes linearly from zero at the input end to its maximum value and then decreases linearly back to zero at the output end,
  wherein the curved waveguide structure is fabricated from any of silicon, SiN, Poly-Si, doped silicon, doped Poly-Si or Ge doped Si,
  wherein the grating structures are composed of a fully metallic layer devoid of any pattern or ribbing, and which are adjacent to but separated from both sides of the curved waveguide structure, and
  the fully metallic layer of the grating structures are located on semiconductor material.

20. The structure of claim 17, wherein the grating structures are periodic or aperiodic or apodized, the grating structures are ribs positioned at an angle of $\alpha=60°$ with respect to a longitudinal axis of the waveguide structure, one set of grating structures extends along an entirety of the curve on one side of the waveguide structure, and the waveguide structure includes a stepped feature.

* * * * *